United States Patent Office 3,551,257
Patented Dec. 29, 1970

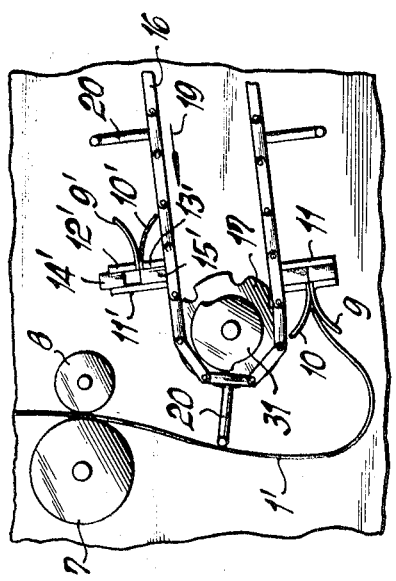

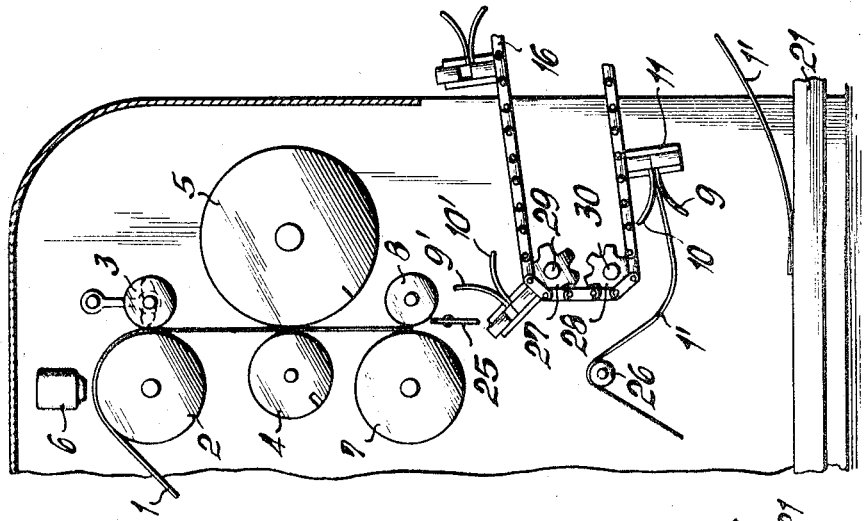
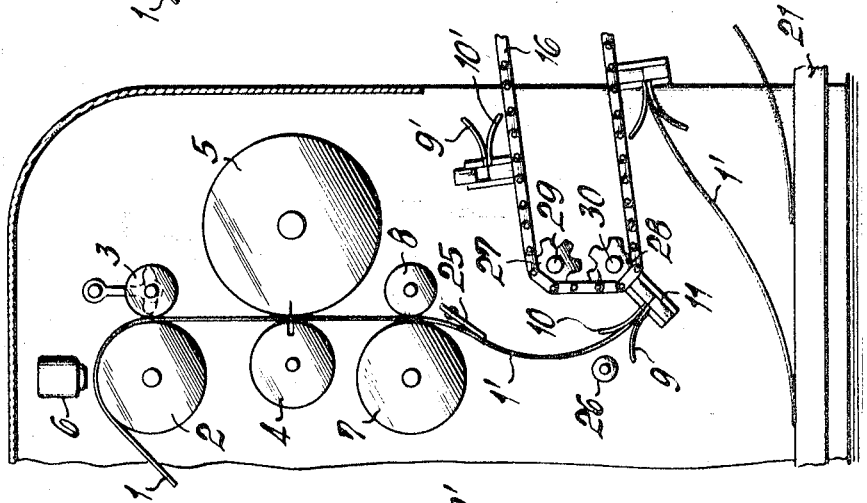
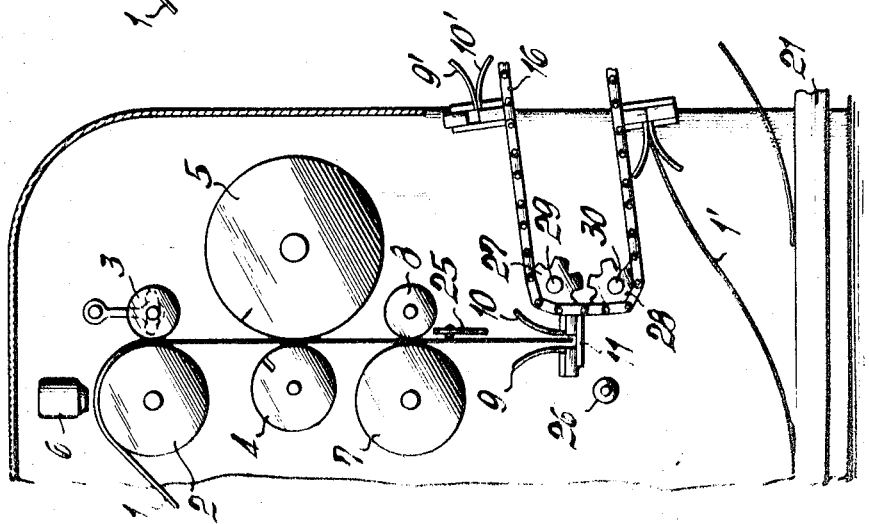

3,551,257
MACHINE FOR MANUFACTURING OPEN BAGS OF PLASTICS MATERIAL
Kurt Rochla, Lengerich, Westphalia, Germany, assignor to Windmoller & Holscher, Lengerich, Westphalia, Germany
Filed May 22, 1967, Ser. No. 640,112
Claims priority, application Germany, May 25, 1966, W 41,664
Int. Cl. B32b *31/20;* B30b *15/34*
U.S. Cl. 156—510         23 Claims

ABSTRACT OF THE DISCLOSURE

The machine comprises a device for severing the incoming tubing of plastics material and revolving endless carrying elements provided with spaced apart heat-sealing jaws. The spacing of the heat-sealing jaws is much less than the length of the bags to be manufactured. The heat-sealing jaws are incorporated in heat-sealing devices provided with means for holding and feeding the workpieces, which are held during the heat-sealing operation only at the end which is to be heat-sealed.

---

Figure 1B:
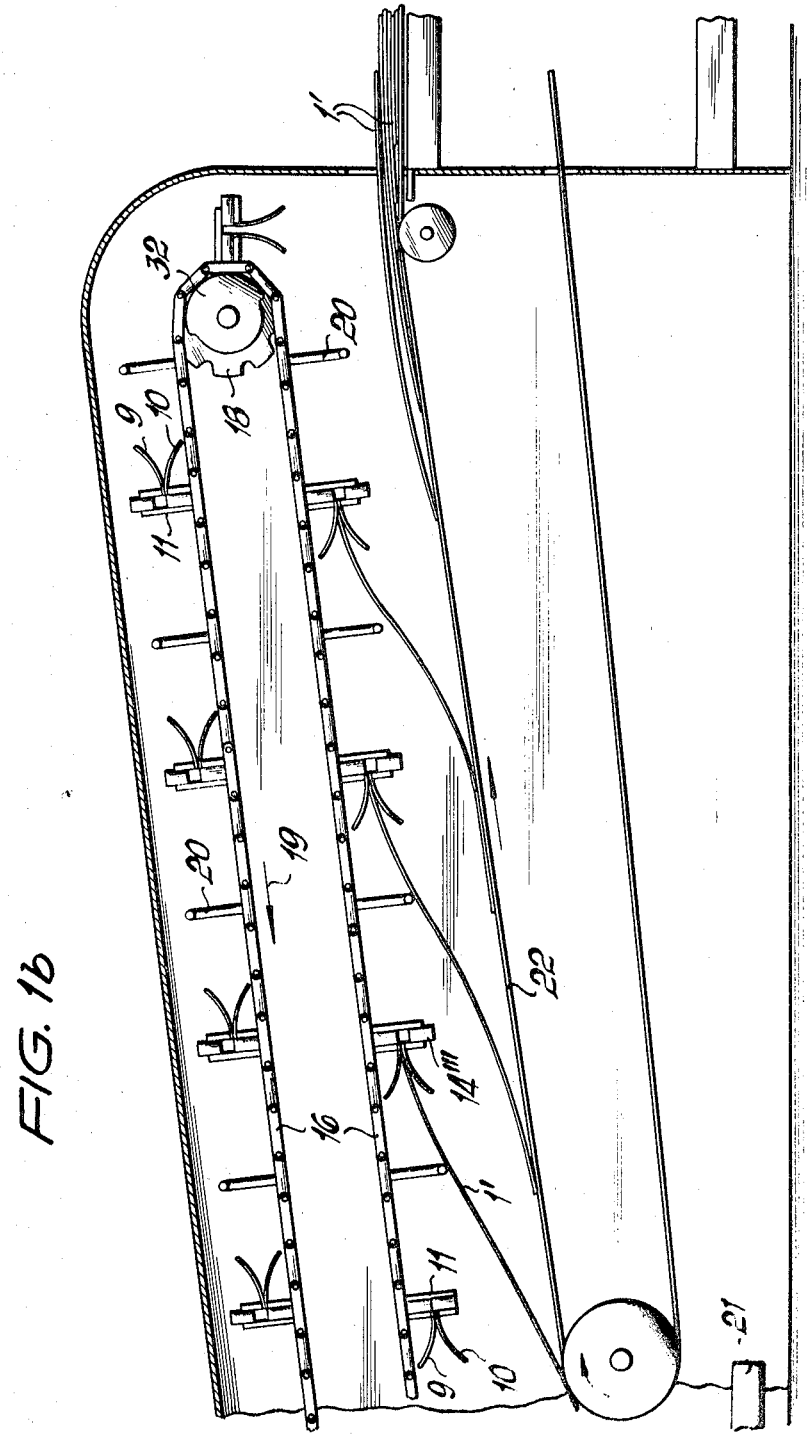

The present invention relates to a machine for manufacturing bags having an open top end for filling the bag and a bottom end which is closed by a heat-sealed seam, which bags are made from continuous tubing of plastics material. The severing of tube sections having the same length as the bags to be made from the continuous tubing and the heat-sealing of each tube section at one end are the most important processing steps to be carried out in the machine according to the invention.

The French patent specification No. 1,182,240 has disclosed a machine in which sections corresponding to the length of the bags are severed by a severing device from continuous tubing and these tube sections are transferred to revolving chains, which are provided with heat-sealing devices for heat-sealing each tube section at one end. The two jaws of the heat-sealing devices are carried respectively by the upper and lower courses of revolving chains, which are arranged one over the other and are moved in synchronism with each other along parallel paths. The spacing between the heat-sealing jaws on the chains exceeds the length of the longest bags to be made by the distance which is required for accommodating between the successive heat-sealing jaws a gripper for gripping the leading end of the workpiece. Thus, the heat-sealing jaws act on the trailing end of the bag, which is fed by the grippers engaging the leading end of the bag. For an adjustment to different bag lengths, the grippers are mounted on additional chains, which are disposed between the lower chains.

The spacing of successive heat-sealing tools mounted on the chains must exceed the length of the longest bag to be made by a uniform distance, which serves for accommodating the gripper, the speed of the chains must be so high that the distance moved by the chains between the gripping of two successive workpieces corresponds to the spacing of the heat-sealing jaws on the chains. The heat-sealing of the ends of the tube sections requires a certain minimum time, which depends on the temperature to which the heat-sealing jaws may be heated and on the thickness of the sheeting. During this time, the high-speed chains move a relatively large distance so that the entire apparatus is relatively long. An increase of the output of such machine requires a further increase in the chain speed and a further increase in the length of the apparatus. In the machine shown in the French patent specification No. 1,182,240, the heat-sealing travel is determined by the time of contact between the upper and lower heat-sealing jaws and is larger only by a ratio of 6.5:5.5 than the spacing of the heat-sealing tools mounted on the chains. As a result, the time between the discharges of two finished bags is almost as long as the time required for heat-sealing one bag. As the making of such heat-sealed seam takes at least 3 seconds, the known machine cannot make more than 20 bags per minute.

It is a primary object of the invention to increase the output of such machine substantially without intolerably increasing the length of the machine.

In a machine for manufacturing open bags of plastics material, comprising a device for severing the incoming tubing of plastics material and revolving endless carrying elements provided with spaced apart heat-sealing jaws, this object is accomplished according to the invention in that the spacing of the heat-sealing jaws is much less than the length of the bags to be manufactured and the heat-sealing jaws are incorporated in heat-sealing devices provided with means for holding and feeding the bag workpieces, which are held during the heat-sealing operation only at the end which is to be heat-sealed.

As the bags are both held and heat-sealed at their leading end, the trailing end portions may overlap during the heat-sealing operation or may depend freely during this time. Owing to the small distance which is to be moved by the carrying elements for the heat-sealing jaws between two successive workpieces, the speed at which the carrying elements for the heat-sealing jaws must be move is low even with a close succession of workpieces so that the distance over which the bag workpieces must be moved during the heat-sealing operation in unison with the heat-sealing jaws is not unduly long.

The arrangement according to the invention affords the further advantage that the exact length of the bag workpieces is not critical. In the known machine, where the bag workpieces are gripped by the grippers at their leading end and heat-sealed at their trailing end, the distance from the leading end to the heat-sealed end is always constant so that length variations between successive bags may have the result that the heat-sealed seam is not always exactly at the end of the tube section. To ensure that the heat-sealing tools will reliably contact the tube section even if the length thereof is at the lower tolerance limit, the distance between the heat-sealing tools and the grippers must be set to this lower tolerance limit. Longer tube sections will then have a portion which projects beyond the heat-sealed seam and is not heat-sealed. This projecting portion represents an unnecessary waste of material and adversely affects the appearance of the bag and reduces the capacity thereof. This disadvantage is also avoided by the invention because the leading end, which is to be heat-sealed according to the invention, will always be exactly gripped and provided with the seam, and any length variations will be reflected at the free end without adverse effects. By experience, variations in the length of the tube sections are inevitable because the material is highly extensible and responds to differences in tension by large differences in length. If the tubing has been printed before, as is usually the case, differences in the spacing of the prints will result in variations in the tube section lengths because the latter are controlled by photoelectric devices in response to the spacing of the prints.

The printed German application No. 1,065,585 has disclosed heat-sealing devices which are mounted on a revolving carrier and are spaced by a distance which is much smaller than the length of the workpieces to be manufactured. These heat-sealing devices are supplied with a continuous tubing rather than with tube sections. The supply of a continuous tubing involves the difficulty that the tubing length disposed between two heat-sealed seams must be inserted into two pockets between the heat-sealing devices. This operation cannot be performed at the speed which is desired so that the desired large output of finished bags cannot be obtained in this way.

A further object of the invention is based on the first inventive concept discussed hereinbefore and resides in that a covering of the succeeding heat-sealing devices by the workpieces that are gripped by the preceding heat-sealing devices should be avoided during the supply of the workpieces. Such an overlap might preclude a supply of bag blanks to the suceeding heat-sealing jaws and the contact with the hot heat-sealing jaws might damage the bag blanks or at least mar the appearance thereof. To accomplish this further object of the invention, it is proposed according to the invention that the heat-sealing operation is mainly performed by the heat-sealing jaws while they are moving along the lower course of the carrying elements, which revolve about horizontal axes, and that a free space for the bag blanks held at their leading edges by the heat-sealing devices is left under the carrying elements. Being held at their leading edge, the bag workpieces will depend under the action of gravity and cannot overlap the succeeding heat-sealing devices.

As the carrying elements for the heat-sealing devices move between two workpieces only by the spacing between successive heat-sealing tools and this spacing is only part of the length of the workpiece, and the web from which the workpieces are severed must be moved through the severing device by an entire workpiece length at the same time, the incoming tube sections have a speed which is a multiple of the speed of the heat-sealing jaws. For this reason it is a further object of the invention to ensure a perfect acceptance of the tube sections by the heat-sealing tools.

This object is accomplished in that the bag workpieces are vertically inserted by their feeding means into the heat-sealing devices. As a result, the depending severed tube section is moved freely and stretched under the action of gravity.

To ensure an exact gripping of the workpieces in the heat-sealing devices, each heat-sealing device is provided according to the invention with a stop face, which succeeds the heat-sealing jaws in the direction of travel of the workpiece and which is engaged by the leading end of the workpiece as it enters the open heat-sealing device, which is then closed to grip the end of the workpiece.

It is also desirable according to the invention to arrange the stop face and the plane of the opening and closing movements of the heat-sealing jaws at right angles to the direction of travel of said jaws. As a result, the tube sections can be introduced into the heat-sealing device in the direction of travel thereof so that the synchronization need not be so exact as in the case of a supply of the workpieces at right angles to the direction of travel of the heat-sealing device. In this connection it is also desirable if the reversal of the heat-sealing devices from the upper to the lower course of the revolving carrying elements is effected below the last feeding device for supplying the workpieces and the retaining jaws of the heat-sealing devices are closed before the reversal has been completed. In this case workpieces can be vertically supplied in the direction of travel of the heat-sealing jaws, as is desired.

To provide for a protection of the still plastic heat-sealed seam from external mechanical influences while the seam is cooling and solidifying in the opened heat-sealing device, the invention provides unheated retaining jaws at the inlet end of the heat-sealing device. In a development of the invention, these retaining jaws may be controlled independently of the heat-sealing jaws.

The provision of retaining jaws which are separate from the heat-sealing jaws affords the important further advantage that the tube sections are not fed by the heat-sealing jaws through the heat-sealing station. Such feeding by the heat-sealing jaws could result in a stretching, deformation and even tearing of the material under the feeding stress as the material has been softened by the sealing heat. In this case, the tube sections would be left back and only the seam portion would remain in the heat-sealing device. This workpiece would thus be destroyed and the material left in the heat-sealing device would cause considerable trouble in the machine and a further wastage of material.

The opening and closing movements of the movable retaining jaws and of the movable heat-sealing jaws may be effected by stationary cams, which are disposed near the path of travel and more particularly adjacent to the reversing portion thereof.

To enable a receipt of the freely depending, leading end of each tube section between the retaining and heat-sealing jaws of each heat-sealing device without need for a very wide opening of the jaws, each heat-sealing device may be provided according to the invention with inlet funnels, which ensure a guidance of the leading ends of the tube sections between the jaws.

A further object according to the invention resides in that a movement in the direction of travel of the succeeding heat-sealing tools is imparted to the tube workpiece which is being upset while advancing at an unreduced speed when the leading end has engaged the stop face of the heat-sealing device and which subsequently falls down. The movement thus imparted to the tube workpiece ensures that the workpiece falling down does not cover the succeeding heat-sealing device. This would prevent a feeding of a workpiece to such succeeding device.

This object can be accomplished according to a first proposal of the invention by the provision of deflectors carried by the revolving carrying elements between successive heat-sealing devices and deflecting the workpiece into the desired direction. According to another proposal of the invention, a deflector which is pivotally movable in synchronism with the machine cycle may be provided below the last pulling device. This deflector is swung out when the workpiece has been upset to such an extent that it must be swung out; the deflector then guides the workpiece in the required direction, which is the direction of travel of the carrying elements for the tools. The embodiment last described has the advantage that it is not necessary to provide a large number of deflectors on the carrying element but a single device is sufficient, although the same must be provided with means for imparting a pivotal movement thereto. A pivotally movable guide means will more reliably effect a deflection of the workpiece as far as to its free end than positively revolving deflectors. If the heat-sealing devices are provided with inlet funnels, the action of the pivoted deflector will be assisted if the leading plate of the funnel is shorter than its trailing plate so that the workpiece can easily be folded about the leading funnel plate.

The heat-sealing devices move substantially in a downward vertical direction on their carrying elements during the receipt of a workpiece and subsequently enter the lower course of the carrying element, where the processing is effected according to the invention. As a result, the tube sections held at one end by the heat-sealing devices depend under the action of gravity. To provide for a stable mounting of the cutting device, which is provided with a varying-speed drive for adaptation to different lengths of the tube sections to be severed and to different relative web speeds, and to accomplish this object with a small expenditure, which means in the first respect that the overall height should be as small as possible, the revolving carrying elements are disposed in the machine on a level which is as low as possible so that the tube sections cannot depend freely throughout their length. For this reason, a supporting slideway is provided according to the invention under the revolving carrying elements and the free ends of the workpieces being advanced slide on this slideway.

When the leading lower end of the descending workpiece has been gripped by a heat-sealing device and the workpiece drops freely onto the slideway when it has left the last pair of feed rolls, the trailing end which is to contact the slideway might not extend freely opposite to the direction of travel but might become reversely turned. This reversely turned portion might be covered by the next bag workpiece so that it cannot be turned back spontaneously or by wiping means. Such an occurrence would cause trouble in the installation in the form of partly doubled workpieces. To avoid such trouble, it is further suggested according to the invention to provide a roller which is rotatably mounted on a stationary axis over the slideway in the line of fall of the free end of the tube section. Gravity will then cause the dropping ends of the tube section to be extended across the roller so that a reverse turning of the end portions will be reliably avoided. When a heat-sealing device which has gripped such workpiece continues its movement, the end of the workpiece will be pulled from the roller and will reliably fall in an extended condition onto the slideway.

According to the invention, the delivery of the finished workpieces is accomplished in a very simple manner by the provision of a conveyor belt, which has an upper course moving under the lower course of the revolving carrying elements in the same direction as the lower course of said carrying elements and conveying the workpieces out of the machine. The workpieces which are held between the retaining jaws and depend onto the slideway are shingled on said conveyor belt in a sequence which is determined by the spacing of the workpieces. When the heat-sealed seam has cooled down, the retaining jaws are opened so that the leading end of the workpiece falls also onto the conveyor belt or on the workpieces which have previously been deposited on said conveyor belt. The speed ratio between the conveyor belt and the tools may be selected so that the spacing of the shingled workpieces on the conveyor belt is larger or smaller than the spacing of the workpieces, a smaller spacing on the conveyor belt being preferable.

The workpieces on the conveyor belt may be formed into groups of a desired number of workpieces in that a higher speed is temporarily imparted to the conveyor belt in suitable intervals of time when a desired number of finished workpieces have been deposited on the belt. The groups comprising a desired number of workpieces on the conveyor belt moving them out of the machine can then easily be pushed together to form stacks and removed in this form from the conveyor belt. Alternatively, the conveyor belt may be intermittently driven with relatively long standstill times so that stacks consisting of a predetermined number of workpieces are formed on the conveyor belt. As the conveyor belt is advanced, the stacks are spaced apart or shingled.

In a particularly preferred embodiment of the invention the reversing portion of the path of the heat-sealing devices, in which portion said devices receive the workpieces, is prolonged in that the carrying elements extend around two horizontal shafts, which are vertically aligned and provided, e.g., with sprockets. This arrangement eliminates the need for introducing the ends of the tube sections into the opened heat-sealing devices at a predetermined time of each cycle of the machine, as is required when the reversal takes place at each end of the conveyor about a single horizontal axis.

Finally, it is contemplated according to the invention that the heat-sealing jaws are pulse-heated and current is supplied to the heat-sealing jaws by current-carrying rails and current collectors.

FIGS. 1a and 1b show diagrammatically and in side elevation a first embodiment of the apparatus according to the invention in successive parts, FIG. 1c is a fragmentary view showing a part of FIG. 1a with the apparatus in a different position of operation, FIGS. 2a, b, c show diagrammatically and in side elevation the receiving part of a modified embodiment of the invention in three different positions of operation.

Tubing 1 of synthetic thermoplastic material to be processed is withdrawn by a feeding device 2, 3, known per se, from a supply roll, not shown, and fed in the direction of the arrow to a severing device 4, 5, which is also known per se. A photoelectric eye 6 senses imprints on the tubing and controls in known manner the feeding speed in such a manner that the severing device 4, 5 severs tube sections in registry with the imprints from the tubing. According to the invention, the severing device is disposed below the feeding device so that the tubing descends substantially vertically between these two devices. A further feeding device 7, 8 is disposed under the severing device and is spaced therefrom by a distance which is at least as long as the shortest tube section to be made so that the shortest tube section to be made will be gripped by the feeding device 7, 8 at the time when such tube section is being severed. As is indicated by the arrows, the tubing descends vertically from the severing device to the further feeding device 7, 8 and through the latter so that the material depends and is guided by gravity into its prescribed path. This is advantageous for the free tubing end, which is formed by each severing operation and falls freely from the severing device 4, 5 to the further feeding device 7, 8.

Below the second feeding device 7, 8, the free end of a tube section is received by a funnel 9, 10 and subsequently engages a stop face 11, whereafter retaining jaws 12, 13 and heat-sealing jaws 14, 15 are closed in a rapid chronological sequence. A plurality of heat-sealing devices 9–15 are mounted on revolving carriers 16, such as chains, in such a manner that the plane of the stop 11 and the plane in which the jaws 12–15 are movable are at right angles to the direction of travel of the revolving carriers 16. Each revolving carrier may extend around two sprockets 17, 18 and may be driven in the direction of arrow 19 by one of these sprockets. The spacing of the devices 9–15 on the carriers is much less than the length of the tube sections to be processed so that the speed of travel of the carriers is smaller by the same ratio than the feeding speed of the tubing 1 and of the tube sections 1'. As parts 11–15 extend at right angles to the carriers 16, the inlet funnels 9, 10 are in a vertical direction under the leading end of the tube sections 1' when the funnels descend substantially in a vertical direction with the carriers 16 during the reversal around the sprocket 17. The speed difference causes the tube section 1' to be upset between the closing retaining jaws 12, 13 and the last feeding device 7, 8. This upsetting is shown in an advanced stage in FIG. 1c. To prevent an unpermissible upsetting opposite to the direction of travel of the carriers 16, the latter are provided with deflectors 20, which urge the tube section in the direction of movement of the carriers so that finally even the free end of the tube section moving out of the feeding device 7, 8, falls down in the direction of travel of the carriers rather than in the opposite direction. Such a falling in the opposite direction would cause the tube section to cover the succeeding tool assembly 9' to 15'. This must be avoided because it would prevent the receipt of the next following tube section by said succeeding tool assembly. The free tube section ends fall onto a supporting slideway 21 (FIGS. 1a, 1b), which is provided to enable a small overall height of the machine. This small overall height of the machine is desirable for a stable mounting of the severing device 4, 5, which may revolve at an adjustable speed for adjustment to different tube sections lengths. Such small overall height could not be achieved if the workpieces were allowed to depend freely. During the feeding of the tube sections by the heat-sealing and retaining devices moving with the lower course of the carriers 16, the tube end is being heat-sealed while it is exactly gripped under control of the stop 11. Owing to the small spacing between the heat-sealing and retaining devices, a large number of tube sections per unit of time can be received, heat-seated and delivered in spite of the fact that the carriers move at a low speed so that the distance travelled during the heat-sealing operation is small.

The heat-sealing jaws are preferably pulse-heated and open before the retaining jaws (see 14′′′ in FIG. 1b) so that the heat-sealed seam of the workpiece can cool and solidify and at the same time may shrink without obstruction by the heat-sealing jaws while the workpiece is still securely held by the retaining jaws until the workpiece is delivered.

Under the last portion of the processing course used for this purpose, a delivery conveyor belt 22 is arranged, which revolves in the direction of the arrow and on which the ends of the tube sections are pulled in an overlapping arrangement. When the heat-sealing and retaining device is near the sprockets 18, the retaining jaws are also opened so that the finished workpiece falls entirely onto the conveyor belt 22. The shingled workpieces shown on the drawing are then moved by the delivery conveyor belt 22 and can subsequently be removed. The ratio between the speeds of the delivery conveyor belt and the workpieces moved by the carrier can be adjusted to control the spacing of the shingled workpieces on the delivery conveyor belt. The delivery conveyor belt 22 may be intermittently driven so that groups of counted workpieces are formed or separate or shingled stacks of workpieces may be formed in known manner with the aid of a counter.

The embodiment shown in FIGS. 2a to 2c differs from the one described hereinbefore mainly in that the deflectors 20 are replaced by a pivoted deflector 25, which is mounted on a stationary axis on the rear of the vertical tubing with respect to the direction of travel of the carriers 16. When a tube section is moving to the funnel 9, 10, the deflector 25 has a vertical orientation (FIG. 2a). When the lower end of the workpiece has engaged the stop 11 and the retaining jaws 12, 13 and the heat-sealing jaws 14, 15 are closed and the upsetting of the tube section 1′ begins, the deflector is swung in a clockwise sense (FIG. 2b) so that the bulge in the tube section is urged into the desired direction. The finally dropping top end of the tube section falls on the deflector in the desired direction and cannot cover the suceeding inlet funnel 9′, 10′. The leading plate 9 or 9′ of the funnel is shorter so that it does not strike the deflector 25.

A rotatable roller 26 is mounted on a stationary axis so that the descending workpiece falls over the roller and is withdrawn over the roller as the heat-sealing device continues its movement. It is thus ensured that the end of the workpiece is extended as it reaches the slideway 21 and will not be reversely turned. Such a reverse turning would disturb the subsequent delivery as the succeeding workpiece would prevent a turning back of the reversely turned portion.

In the second embodiment, the vertically descending travel of the receiving, retaining and heat-sealing devices is prolonged to ensure a good receipt of the workpiece. To this end, the tool carriers 16 extend around two shafts 29 and 30, which are vertically aligned and provided with sprockets 27 and 28.

The opening and closing movements of the movable heat-sealing jaw 14 are effected by stationary cams, not shown, which are spaced along the path of travel. The movable retaining jaws 12 are also given by stationary cams, which in the embodiment shown in FIGS. 1a to 1c are designated 27 and 28 and arranged concentrically with the sprockets 17 and 18. Current is supplied to the heat-sealing devices by stationary current-carrying rails extending along the path of travel, and current collectors mounted on the revolving heat-sealing tools and cooperating with the rails. These rails and current collectors are not shown.

What is claimed is:

1. Apparatus for manufacturing open bags from a flattened tube of plastic material, comprising means to sever tube sections from said tube, means to move said tube sections along a predetermined path of travel, a plurality of pairs of cooperating heat-sealing jaws for heat-sealing one end of said tube sections, a plurality of pairs of cooperating holding bars for holding said tube sections adjacent the end thereof to be heat-sealed, common revolving carrying means for said heat-sealing jaws and said holding bars, said heat-sealing jaws and said holding bars being arranged on said common carrying means such that one pair each of said holding bars is located immediately upstream of one pair each of said heat-sealing jaws with respect to said path of travel, and the spacing of two succeeding pairs of said heat-sealing jaws and holding bars on said common carrying means being much less than the length of the bags to be manufactured.

2. A machine according to claim 1, characterized in that the heat-sealing operation is mainly performed by the heat-sealing jaws while they are moving along the lower course of the carrying elements, which revolve about horizontal axes, and that a free space for the bag blanks held at their leading edges by the heat-sealing devices is left under the carrying elements.

3. A machine according to claim 1, characterized in that feeding means are provided for vertically feeding the bag workpieces from above into the heat-sealing devices.

4. Apparatus according to claim 3, wherein each pair of said heat-sealing jaws comprises a stop face disposed parallel to the moving direction of said jaws adjacent the latter downstream of said path of travel.

5. A machine according to claim 4, characterized in that the stop face and the plane in which the heat-sealing jaws are opened and closed are at right angles to the direction of travel of said jaws.

6. A machine according to claim 5, characterized in that the path along which the heat-sealing devices are reversed from the upper course to the lower course of the revolving carrying elements is disposed below the last feeding device for supplying the workpieces and the jaws are opened approximately until they have reached the middle of said reversing path.

7. A machine according to claim 1, characterized in that the retaining jaws are adapted to be controlled independently of the heat-sealing jaws.

8. A machine according to claim 7, characterized in that the heat-sealing jaws are opened before the retaining jaws.

9. A machine according to claim 8, characterized in that the opening and closing movements of the movable heat-sealing jaws are effected by stationary cams spaced along the path of travel.

10. A machine according to claim 8, characterized in that the opening and closing movements of the movable retaining jaws are effected by stationary cams.

11. A machine according to claim 1, characterized by inlet funnels associated with each heat-sealing device.

12. A machine according to claim 1, characterized by deflectors provided on the revolving carrying elements and disposed between the heat-sealing devices.

13. A machine according to claim 1, characterized by a deflector, which is disposed below the last feeding device and pivotally movable in synchronism with the working cycle of the machine.

14. A machine according to claim 11, characterized in that the inlet funnel has with respect to the direction of travel a leading plate, which is shorter than the trailing plate thereof.

15. A machine according to claim 1, characterized by a supporting slideway disposed under the revolving carrying elements.

16. A machine according to claim 15, characterized by a roller, which is rotatably mounted on a stationary axis over the supporting slideway adjacent to the line of fall of the free tube section end.

17. A machine according to claim 1, characterized by a conveyor belt, which has an upper course moving under the lower course of the revolving carrying elements and in the same direction as the same and conveying the workpieces out of the machine.

18. A machine according to claim 17, characterized in that the conveyor belt is adapted to be driven at an adjustable speed.

19. A machine according to claim 18, characterized in that the conveyor belt is adapted to be temporarily driven at a higher speed in intervals of time after the deposition of a desired number of finished workpieces.

20. A machine according to claim 17, characterized in that the conveyor belt is adapted to be driven intermittently in response to the deposition of a predetermined number of workpieces.

21. A machine according to claim 6, characterized in that the path along which the heat-sealing devices are returned and along which they receive the workpieces is prolonged in that the carrying elements extend around two horizontal shafts, which are vertically aligned and are provided, e.g., with sprockets.

22. A machine according to claim 1, characterized in that the heat-sealing jaws are pulse-heated.

23. A machine according to claim 1, characterized in that current is supplied to the heat-sealing jaws by current-carrying rails and current collectors.

References Cited

UNITED STATES PATENTS

| | | | |
|---|---|---|---|
| 2,466,643 | 4/1949 | Magid | 93—HSDUX |
| 3,192,095 | 6/1965 | Doyen et al. | 156—510 |

FOREIGN PATENTS

| | | | |
|---|---|---|---|
| 1,182,240 | 6/1959 | France | 156—510UX |

BENJAMIN A. BORCHELT, Primary Examiner

J. M. HANLEY, Assistant Examiner

U.S. Cl. X.R.

156—583; 219—243